United States Patent
Buerk et al.

(10) Patent No.: US 7,166,976 B2
(45) Date of Patent: Jan. 23, 2007

(54) METHOD AND CONTROL CIRCUIT FOR REDUCING LINE-BOUND DISTURBANCES IN A PULSE-WIDTH MODULATED CONTROL OF AN ELECTRIC MOTOR

(75) Inventors: Peter Buerk, Lichtenau-Grauelsbaum (DE); Stefan Koch, Kappelrodeck (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/543,447

(22) PCT Filed: Oct. 21, 2003

(86) PCT No.: PCT/DE03/03481

§ 371 (c)(1),
(2), (4) Date: Jan. 11, 2006

(87) PCT Pub. No.: WO2004/070932

PCT Pub. Date: Aug. 19, 2004

(65) Prior Publication Data
US 2006/0214609 A1   Sep. 28, 2006

(30) Foreign Application Priority Data
Jan. 24, 2003   (DE) ................... 103 02 673

(51) Int. Cl.
*H02P 7/29* (2006.01)
(52) U.S. Cl. .............. 318/268; 318/504; 388/831
(58) Field of Classification Search ........ 318/244–246, 318/268, 440, 442, 452–455, 484, 504; 388/816, 388/819, 821–823, 830–831, 833, 921
See application file for complete search history.

(56) References Cited

U.S. PATENT DOCUMENTS

| 5,535,115 | A | * | 7/1996 | Kishi et al. ............... 363/98 |
| 5,664,047 | A | * | 9/1997 | Hanson ................. 388/811 |
| 5,781,362 | A | * | 7/1998 | Bang ................. 360/78.05 |
| 5,859,511 | A | * | 1/1999 | Carobolante ............ 388/811 |
| 6,118,932 | A | * | 9/2000 | Maurio et al. ........... 388/811 |

FOREIGN PATENT DOCUMENTS

| DE | 42 29 342 | 3/1994 |
| DE | 195 30 029 | 2/1997 |
| EP | 0 722 214 | 7/1996 |
| EP | 0 855 799 | 7/1998 |
| EP | 1 148 622 | 10/2001 |

* cited by examiner

*Primary Examiner*—Bentsu Ro
(74) *Attorney, Agent, or Firm*—Kenyon & Kenyon LLP

(57) ABSTRACT

A method for reducing line-conducted interference in a pulse width modulated triggering system of an electric motor, a triggering pulse width modulation signal having, in one clock cycle, one or more signal edges between a first signal level and a second signal level, the pulse width modulation signal being generated in such a way that at least one of the signal edges has a first segment having a first edge slope and a second segment having a second edge slope, the absolute value of the first edge slope being less than the absolute value of the second edge slope.

10 Claims, 2 Drawing Sheets

METHOD AND CONTROL CIRCUIT FOR REDUCING LINE-BOUND DISTURBANCES IN A PULSE-WIDTH MODULATED CONTROL OF AN ELECTRIC MOTOR

FIELD OF THE INVENTION

The invention concerns a method for reducing line-conducted interference in a pulse width modulated triggering system of an electric motor. The invention furthermore concerns a control circuit for triggering an electric motor with the aid of a pulse width modulation signal.

BACKGROUND INFORMATION

An electric motor can be triggered in almost stepless fashion with the aid of a pulse width modulation signal. The pulse width modulation signal is applied for that purpose to a switching device that preferably encompasses a field-effect power transistor, in order to apply the supply voltage to an electric motor as a function of the pulse width modulation signal.

The pulse width modulation signal has a triggering frequency and a pulse duty factor. The pulse duty factor determines the degree of triggering of the electric motor, and is defined as the ratio between the time during which the electric motor is switched on, and the period of the triggering frequency.

When selecting the triggering frequency, particular care must be taken that the selected frequency is not in the audible region, since troublesome audible oscillations of the electric motor or the triggering circuit may otherwise occur.

The periodic switching of the supply voltage by the electric motor that is performed in accordance with the pulse width modulation signal results in periodic voltage fluctuations on the supply lines, which can have an interfering effect on the supply voltage system. For this purpose, a low-pass filter circuit is usually provided in the supply voltage system in order to filter out to the greatest possible extent, and thus smooth, high-frequency voltage fluctuations, i.e. voltage fluctuations in the region of the triggering frequency and higher. This is not, however, completely achieved by a low-pass filter circuit.

The switching characteristic curve results in abrupt switching, especially because of the steep triggering edges at a gate input of the field-effect power transistor, so that in addition to the frequency component of the triggering frequency, a large component of higher-frequency harmonics also occurs in the supply voltage line. The higher the frequency, the more disruptive these are in the supply voltage system.

It is the object of the present invention to provide a method and a control circuit in order to reduce line-conducted interference in a pulse width modulated triggering system of an electric motor.

SUMMARY OF THE INVENTION

According to a first aspect of the present invention, a method is provided for reducing line-conducted interference in a pulse width modulated triggering system of an electric motor. A triggering pulse width modulation signal has, in one clock cycle, one or more signal edges between a first signal level and a second signal level. The pulse width modulation signal is generated in such a way that at least one of the signal edges has a first segment having a first edge slope and a second segment having a second edge slope, the absolute value of the first edge slope being less than the absolute value of the second edge slope.

The steepness of the edges of the voltage changes on the supply voltage line is reduced in this fashion. For this purpose, firstly a portion of the signal swing of the pulse width modulation signal is implemented with a low steepness for the respective edge. The remainder of the voltage swing of the signal edge is then implemented with a large edge slope. Because the pulse width modulation signal is used as a triggering signal for a switching device, the switching device is also made conductive, in accordance with the differing steepness of the signal profile of the pulse width modulation signal, with a lesser steepness overall.

The result of this is that during the first segment of the signal edge, as a result of the slower voltage change only a small high-frequency interference component is caused in the supply voltage lines. Because the voltage swing in the second segment of the signal edge is less than the total voltage swing between the first and second signal levels, the absolute values of the amplitudes of the high-frequency interference caused thereby are also reduced to the same extent.

In addition, when a field-effect power transistor is used in the switching device, a slower change in the resistance of the field-effect power transistor can be achieved by way of the first segment of the signal edge, especially in a switching range of the field-effect power transistor in which the resistance change between drain and source is very large as compared with a change in the gate-source voltage. The second segment of the signal edge then serves to bring about, in the saturation region of the switching range of the field-effect power transistor (i.e. in which the resistance change is small in terms of the change in gate-source voltage), a change in the resistance between drain and source that is not too slow. The result is on the one hand to prevent the field-effect transistor from being blocked or made conductive too rapidly, i.e. with too great a resistance change per unit time; and on the other hand to achieve complete conductivity of the field-effect power transistor within the defined time.

The result that can thereby be achieved is therefore, in particular, to decrease the amplitudes of the harmonics of the voltage changes caused by switching of the switching device, so that the line-conducted interference upon triggering of the switching device is reduced with the aid of a pulse width modulation signal generated with the method according to the present invention.

Provision is preferably made for the first segment of the signal edge to be produced with the aid of a first pulse signal, and the second segment with the aid of a second pulse signal. The first and the second pulse signal are offset in time from one another, the time difference between the first and the second pulse signal corresponding substantially to the time length of the first segment of the signal edge. In this fashion, the two segments of the signal edge can be produced with the aid of two pulse signals, offset in time from one another, that can be generated by a pulse signal generator. The first pulse signal causes the change in the signal edge in accordance with the first edge slope, and the second pulse signal the change in the signal edge in accordance with the second edge slope, until the corresponding signal level is reached.

According to a further aspect of the present invention, a control circuit is provided for triggering an electric motor with the aid of a pulse width modulation signal. The electric motor is connectable to a supply voltage via a switching device controllable by way of the pulse width modulation signal. The pulse width modulation signal is generated by a control module for triggering a switching device. The pulse width modulation signal that triggers the electric motor has, in one clock cycle, one or more signal edges between a first signal level and a second signal level. The control module is configured so as to generate at least one of the signal edges in such a way that the signal edge has a first segment having a first edge slope and a second segment having a second edge slope, the absolute value of the first edge slope being less than the absolute value of the second edge slope.

It is possible in this fashion to create a control circuit which has a control module in order to produce signal edges with which the switching device, and thus the electric motor, is triggered in such a way that line-conducted interference is minimized. This is achieved in the manner described above, namely by the fact that initially a shallower slope is provided in a first segment of the signal edge of the pulse width modulation signal, and only in the second segment of the signal edge of the pulse width modulation signal is the corresponding desired signal level attained with a large edge slope. As a result, the voltage swing caused at the electric motor by switching of the switching device is shallower, so that the harmonic frequency components (which are multiples of the triggering frequency of the pulse width modulation signal) produced by the edge slope are reduced. Because interference on supply lines is more harmful in particular at higher frequencies, a considerable reduction in line-conducted interference can thereby be achieved.

Provision can be made for the control module to have a pulse signal generator in order to generate a first pulse signal and a second, time-offset pulse signal. Also provided is an edge generator circuit, in order to produce the first segment of the signal edge with the aid of the first pulse signal and the second segment of the signal edge with the aid of the second pulse signal. The duration of the two segments of the signal edge can thus be defined exactly, in simple fashion, with the aid of the pulse signal generator.

The edge generator circuit preferably encompasses a first amplifier section for triggering the switching device, the first amplifier section causing a recharging of a control input of a switching device in accordance with the first edge steepness. The edge generator circuit preferably encompasses a second amplifier section for triggering the switching device, the second amplifier section causing a recharging of the control input of the switching device in accordance with the second edge steepness.

As an alternative to the first and the second amplifier section, provision can also be made for the edge generator circuit to have a third amplifier section for triggering the switching device, the third amplifier section having a first, second, third, and fourth transistor. The transistors are connected in series between a high supply voltage potential and a low supply voltage potential, the first and third transistors being triggered by the first pulse signal, and the second and fourth transistors by the second pulse signal. For a particular signal level of the respective pulse signal, only the first or third transistor, or the second or fourth transistor, is made conductive in each case. It is possible in this fashion to create an amplifier section that is connected to the control input of the switching device and that has two outputs which recharge the capacitance of the control input of the switching device, in particular the gate capacitance of a field-effect power transistor, at different rates.

The first segment of the signal edge is produced by the fact that a first node between the first and the second transistor is connected via a first resistor to the control input of the switching device, and that a second node between the third and the fourth transistor is connected via a second resistor to the low supply voltage potential. As a result, when the first or third transistor is made conductive with the aid of the first pulse signal, the switching capacitance of the switching device or the triggering line is recharged through the first or second resistor, so that a first edge slope is achieved. The fact that the second or fourth transistor is made conductive, after the first or third transistor has been made conductive, causes the switching input of the switching device, which is connected to a third node between the first and third transistors via a third resistor, to be connected to either the high or the low supply voltage and thus to be rapidly recharged, so that the second edge slope is achieved at the switching input. The third resistor is provided with a substantially lower resistance value than the first and the second resistor. The third resistor can also be omitted. The transistors can be embodied as npn or pnp transistors, or as n-channel and p-channel field-effect transistors.

Because the triggering voltage of the switching device often lies in a different voltage region than the voltage levels of the pulse signals (especially when a field-effect power transistor is used), voltage level converters can be provided in order to adapt the voltage levels of the first and second pulse signals that are applied to the first through fourth transistors to the requisite triggering voltage of the first through fourth transistors.

DETAILED DESCRIPTION

Figure 1:
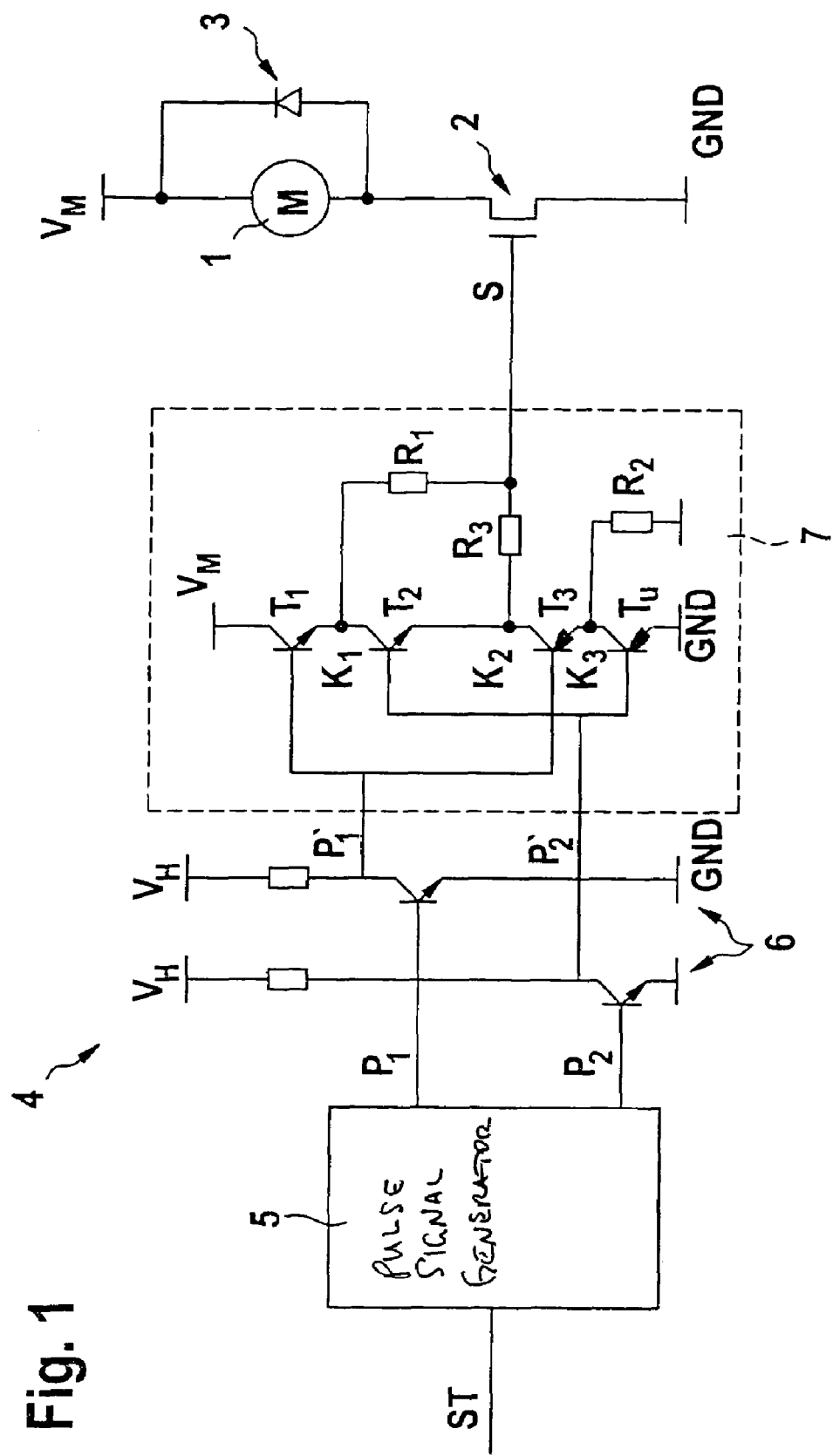
FIG. 1 is a circuit diagram of a preferred embodiment of the control circuit according to the present invention.

FIG. 1 depicts a control circuit in accordance with a preferred embodiment of the invention. The control circuit serves to trigger an electric motor 1 with the aid of a switching device 2 that is embodied as a field-effect power transistor 2. The series circuit of electric motor 1 and field-effect power transistor 2 is connected to a motor supply voltage potential $V_{mot}$ and to ground potential $V_{GND}$. As a function of a pulse width modulation signal S, switching device 2 is made conductive or blocked so that the supply voltage is or is not applied to electric motor 1.

In order to prevent the occurrence of voltage peaks at the drain terminal of field-effect power transistor 2 when field-effect power transistor 2 is switched off, due to the inherent inductance of electric motor 1, a freewheeling diode 3 is provided which discharges the voltage peaks toward motor supply voltage potential $V_{mot}$.

A control module 4, which has a pulse signal generator 5, two voltage level converters 6, and an edge generator circuit 7, is provided in order to generate pulse width modulation signal S. Pulse signal generator 5 receives an actuating signal ST via a network (e.g. a CAN network) or from a control unit (not depicted), actuating signal ST indicating the degree to which electric motor 1 is to be triggered.

Pulse signal generator 5 ascertains, from actuating value ST, a first pulse signal P1 having a triggering frequency f and a pulse duty factor Tv.

Pulse duty factor Tv indicates the ratio between the length of time within the period of triggering frequency f during which field-effect power transistor 2 is to be triggered, i.e. made conductive, and the entire period length of triggering frequency f. The triggering frequency is substantially predefined, and is preferably in a range beyond the limit of audibility in order to prevent irritating oscillating noises in control circuit or electric motor 1. Triggering frequency f is preferably approximately 20 kHz.

Pulse signal generator 5 furthermore produces a second pulse signal P2 that has substantially the same pulse duty factor Tv as first pulse signal P1 but is offset in time after first pulse signal P1. First and second pulse signals P1, P2 are conveyed to the respectively associated voltage level converters 6. Voltage level converters 6 are embodied as emitter circuits, and allow the High level of the converted first or second pulse signal P1, P2 to be raised to a higher voltage level that is defined by supply voltage VH applied to voltage level converters 6. The converted first and second pulse signals P1' and P2' are conveyed to edge generator circuit 7.

Edge generator circuit 7 has a first, second, third, and fourth transistor T1, T2, T3, T4, which are connected in series. High supply voltage potential VH is applied at a first terminal of first transistor T1. A second terminal of first transistor T1 is connected to a first terminal of second transistor T2, and forms a first node K1. A second terminal of second transistor T2 is connected to a first terminal of third transistor T3, and forms a second node K2. A second terminal of third transistor T3 is connected to a first terminal of fourth transistor T4, and forms a third node K3. A second terminal of fourth transistor T4 is connected to ground potential GND.

First converted pulse signal P1' is connected to the control input of first transistor T1 and to a control input of third transistor T3. Converted second pulse signal P2' is connected to a control input of second transistor T2 and to a control input of fourth transistor T4. First and second transistors T1, T2 are preferably npn bipolar transistors, and third and fourth transistors T3, T4 are preferably pnp bipolar transistors. An embodiment of edge generator circuit 7 having n-channel and p-channel field-effect transistors is likewise conceivable.

First node K1 is connected via a first resistor R1 to the control input of field-effect power transistor 2. Third node K3 is connected via a second resistor R2 to ground potential. Upon application of first converted pulse signal P1' to the control inputs of the mutually complementary first and third transistors T1, T3, one of the two transistors T1, T2 is made conductive and the respective other one is blocked.

If first transistor T1 is conductive, high supply voltage VH is therefore applied via resistor R1 to the control input of field-effect power transistor 2. The control input of field-effect power transistor 2 usually has an inherent capacitance (a gate capacitance, in the case of a field-effect transistor) that is recharged by the recharge current flowing through first resistor R1 and first transistor T1. In addition to this there is the line capacitance of the triggering line for the pulse width modulation signal, which flattens the signal edge that is generated.

If first transistor T1 is blocked, third transistor T3 is therefore conductive, and a recharge current which recharges the capacitance of the control input of field-effect power transistor 2, flows through second resistor R2, third transistor T3, and a further third resistor R3 that connects second node K2 to the control input of field-effect power transistor 2. Recharging of the capacitance of the control input is therefore accomplished with a reduced current that is limited substantially by first resistor R1 and second resistor R2.

Second converted pulse signal P2' is time-delayed, but is otherwise substantially identical to first converted pulse signal P1' in terms of its direction, its length in accordance with pulse duty factor Tv, its triggering frequency, and its signal levels. This means that because first transistor T1 is conductive as a result of first converted pulse signal P1', second transistor T2 is initially blocked until second converted pulse signal P2' likewise stipulates that second transistor T2 be made conductive. In the same fashion, when third transistor T3 is conductive, third transistor T4 is initially blocked until the time-offset second converted pulse signal P2' stipulates that fourth transistor T4 be made conductive.

Shortly after either first transistor T1 or third transistor T3 has been made conductive, second transistor T2 or fourth transistor T4 is therefore also made conductive by the subsequent edge of second converted pulse signal P2', so that second node K2 is connected either to high supply voltage potential VH or to ground potential GND. The capacitance of the control input of field-effect power transistor switching device 2 is then recharged through third resistor R3 and second node K2.

The resistance value of third resistor R3 is substantially less than the resistance values of first and second resistors R1, R2. The control input is thereby rapidly recharged after the corresponding edge of second converted pulse signal P2', the recharge time being defined substantially by third resistor R3 and the control input capacitance. The resistance value of third resistor R3 should preferably be kept very low, in order to achieve a steep edge between the voltage level achieved after the first segment of the edge of the pulse width modulation signal and the desired voltage level. Resistor R3 can even be omitted.

In this fashion, field-effect power transistor 2 is switched with a pulse width modulation signal S that has two segments. The first segment is defined by the time between a signal edge of first converted pulse signal P1' and the corresponding signal edge of second converted pulse signal P2'; by the resistance values of first and second resistors R1, R2; and by the capacitance of the control input of field-effect power transistor 2.

The steepness of the pulse width modulation signal is determined by the resistance values of first and second resistors R1, R2 and by the capacitance of the control input, whereas the elapsed time between the mutually associated signal edges of first and second converted pulse signals P1', P2' defines a first voltage swing of pulse width modulation signal S that is to be achieved with the first segment of the edge of the pulse width modulation signal. The steepness of the second segment of the edge of the pulse width modulation signal is defined substantially by the resistance value of third resistor R3 and by the capacitance of the control input of switching device 2.

The circuit according to the present invention offers the advantage of reducing line-conducted interference on the supply voltage lines for electric motor 1 by the fact that the high-frequency component of the voltage change is diminished. The steeper the signal edge of pulse width modulation signal S, the steeper the switching behavior of field-effect power transistor 2 and the greater the high-frequency component resulting from harmonic frequencies on the supply line to electric motor 1. Line-conducted interference is reduced by the fact that the change in the resistance of field-effect power transistors 2 during switching is slowed down. The provision of a first segment of the signal edge of pulse width modulation signal S having a lesser slope slows down switching, and considerably reduces the harmonic-frequency component of the activation frequency.

Figure 2:
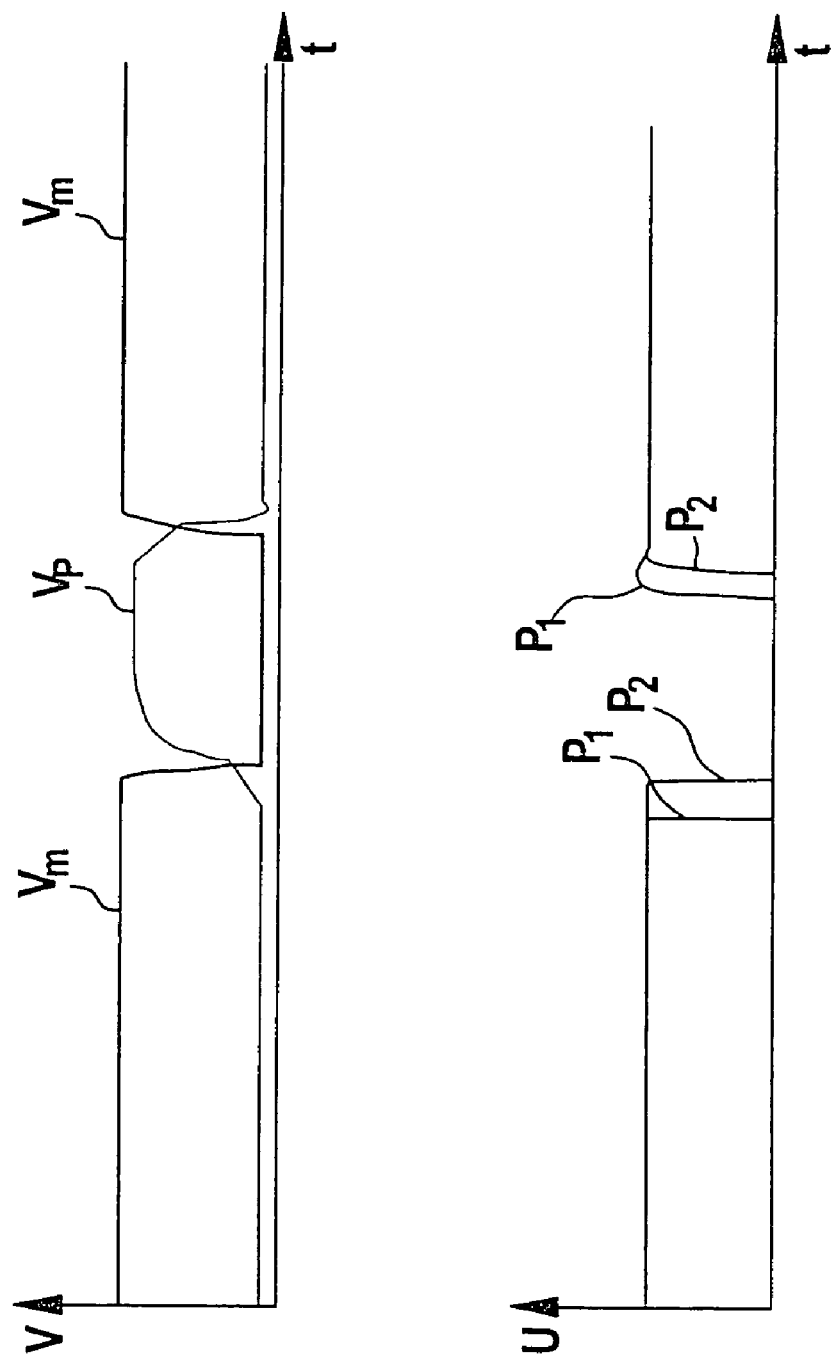
FIG. 2 shows the signal profiles of the pulse signals, the pulse width modulation signal, and the motor voltage.

FIG. 2 depicts the voltage profiles VP of the pulse width modulation signal at the control input of field-effect power transistor 2, voltage profile VM at the motor, and first and second pulse signals P1, P2. It is clearly evident that between the falling edge of first pulse signal P1 and the falling edge of second pulse signal P2, there is a shallower rise in pulse width modulation signal S at the control input of field-effect power transistor 2; and that after the second signal edge of second pulse signal P2 drops off, a steeper rise occurs in the voltage level of pulse width modulation signal S.

The first and second segments of the signal edge of pulse width modulation signal S are preferably dimensioned in accordance with the switching behavior of field-effect power transistor 2. In one specific voltage range, field-effect power transistor 2 switches very rapidly, i.e. the change in resistance between drain and source is very large as compared with a voltage change VP in the pulse width modulation signal that is present at the gate terminal. In a second voltage range, namely in a saturation state, the change in resistance between drain and source is much less in terms of the change in the pulse width modulation signal.

The first segment of the signal edge and the second segment of the signal edge can thus preferably be adapted to the first and the second voltage range of the switching behavior of field-effect power transistor 2 in such a way that with the first, lower-slope segment, the rapid switching behavior of the field-effect power transistor is slowed down. At the point in time of the edge of the second pulse signal, the field-effect power transistor should then reach a gate voltage at which saturation of the switching behavior is substantially beginning or has already occurred, i.e. a switching range is reached in which the resistance change is low in terms of a change in gate-source voltage. It is possible in this fashion, with the aid of a first and a second segment of the signal edge, to prevent the voltage change at electric motor 1 from changing too rapidly.

By changing the time offset between first and second pulse signals P1, P2, it is possible to generate different edges for switching field-effect power transistor 2 as a function of motor rotation speed. Voltage profiles that are advantageous in terms of line-conducted interference voltage can thus be achieved for pulse width modulation signal S, and consequently for the voltage of the motor and of field-effect power transistor 2.

What is claimed is:

1. A control circuit for triggering an electric motor via a pulse width modulation signal, comprising:
    a switching device via which the electric motor is connectable to a supply voltage, the switching device being controllable by way of the pulse width modulation signal; and
    a control module for generating the pulse width modulation signal for triggering the switching device, wherein:
        the pulse width modulation signal has, in one clock cycle, at least one signal edge between a first signal level and a second signal level,
        the control module generates the at least one signal edge in such a way that the at least one signal edge has a first segment having a first edge slope and a second segment having a second edge slope,
        an absolute value of the first edge slope is less than an absolute value of the second edge slope;
        the control module includes a pulse signal generator in order to generate a first pulse signal and a second, time-offset pulse signal; and
        an edge generator circuit produces the first segment via the first pulse signal and the second segment via the second, time-offset pulse signal.

2. The control circuit as recited in claim 1, wherein:
    the edge generator circuit includes a first amplifier section for triggering the switching device, and
    the first amplifier section causes a recharging of a control input of the switching device in accordance with the first edge slope.

3. The control circuit as recited in claim 2, wherein:
    the edge generator circuit includes a second amplifier section for triggering the switching device,
    the second amplifier section causes a recharging of the control input of the switching device in accordance with the second edge slope.

4. The control circuit as recited in claim 3, wherein:
    the edge generator circuit includes a third amplifier section for triggering the switching device,
    the third amplifier section including a first transistor, a second transistor, a third transistor, and a fourth transistor that are connected in series between a high supply voltage potential and a low supply voltage potential,
    the first transistor and the third transistor are triggered by the first pulse signal, and
    the second transistor and the fourth transistor are triggered by the second, time-offset pulse signal.

5. The control circuit as recited in claim 4, further comprising:
    a first resistor;
    a second transistor;
    a first node located between the first transistor and the second transistor and connected via the first resistor to the control input of the switching device; and
    a second node located between the third transistor and the fourth transistor and connected via the second resistor to the low supply voltage potential.

6. The control circuit as recited in claim 5, further comprising:
    a third resistor; and
    a third node located between the second transistor and the third transistor and connected via the third resistor to the control input of the switching device.

7. The control circuit as recited in claim 4, wherein:
    the first transistor and the second transistor are npn transistors, and
    the third transistor and the fourth transistor are pnp transistors.

8. The control circuit as recited in claim 4, wherein:
    the first transistor and the second transistor are p-channel field-effect transistors, and
    the third transistor and the fourth transistor are n-channel field-effect transistors.

9. The control circuit as recited in claim 4, further comprising:
    a first voltage level converter; and
    a second voltage level converter, wherein:
        the first transistor and the third transistor are activated via the first voltage level converter,
        the second transistor and the fourth transistors are activated via the second voltage level converter,
        the first voltage level converter converts a voltage level of the first pulse signal, and
        the second voltage level converter converts a voltage level of the second, time-offset pulse signal.

10. A method for reducing a line-conducted interference in a pulse width modulated triggering system of an electric motor, comprising:

providing a triggering pulse width modulation signal having, in one clock cycle, at least one signal edge between a first signal level and a second signal level;

causing the pulse width modulation signal to trigger the electric motor in such a way that the at least one signal edge has a first segment having a first edge slope and a second segment having a second edge slope, an absolute value of the first edge slope being less than an absolute value of the second edge slope producing the first segment via a first pulse signal;

producing the second segment via a second pulse signal; and offsetting the first pulse signal and the second pulse signal in time from one another, a time difference between the first pulse signal and the second pulse signal corresponding substantially to a time length of the first segment.

* * * * *